(12) United States Patent
Ohashi (10) Patent No.: US 10,072,772 B2
(45) Date of Patent: Sep. 11, 2018

(54) PLANETARY GEAR TRANSMISSION FOR A MOTOR AND MANUALLY OPERABLE VALVE

(71) Applicant: Azbil Corporation, Tokyo (JP)

(72) Inventor: Tomofumi Ohashi, Tokyo (JP)

(73) Assignee: Azbil Corporation, Tokyo (JP)

( * ) Notice: Subject to any disclaimer, the term of this patent is extended or adjusted under 35 U.S.C. 154(b) by 6 days.

(21) Appl. No.: 15/298,818

(22) Filed: Oct. 20, 2016

(65) Prior Publication Data

US 2017/0114918 A1    Apr. 27, 2017

(30) Foreign Application Priority Data

Oct. 23, 2015  (JP) ................. 2015-208850

(51) Int. Cl.
*F16K 31/04*  (2006.01)
*F16H 1/28*  (2006.01)
*F16K 31/05*  (2006.01)

(52) U.S. Cl.
CPC ............. *F16K 31/043* (2013.01); *F16H 1/28* (2013.01); *F16K 31/055* (2013.01)

(58) Field of Classification Search
CPC ........ F16K 31/05; F16K 31/055; F16K 31/53; F16K 31/535; F16H 1/28; F16H 1/46;
(Continued)

(56) References Cited

U.S. PATENT DOCUMENTS 3,908,959 A * 9/1975 Fichtner ................... F16J 15/50
251/129.03

4,621,789 A * 11/1986 Fukamachi ........... F16K 31/045
185/40 R
(Continued)

FOREIGN PATENT DOCUMENTS

JP    H10-213253 A    8/1998
JP    2007-177405 A    7/2007
(Continued)

OTHER PUBLICATIONS

Korean Intellectual Property Office, "Office Action," issued in KR Patent Application No. KR 10-2016-0137751, which is a Korean counterpart of U.S. Appl. No. 15/298,838, with an issuance dated Apr. 2, 2018, 9 pages (5 pages of English Translation of Korean Office Action, 4 pages of Original Korean Office Action).

*Primary Examiner* — Matthew W Jellett
(74) *Attorney, Agent, or Firm* — Amster, Rothstein & Ebenstein LLP (57) ABSTRACT

A setting/operating device including: a sun gear that is rotated by a rotational force from a drive motor; a fixed internal gear fixedly disposed to surround the sun gear and having teeth on an inner peripheral surface; a plurality of planetary gears disposed between the sun gear and the fixed internal gear that rotate in engagement with the sun gear and the fixed internal gear while revolving around the sun gear; a movable internal gear disposed coaxially with the fixed internal gear, having teeth that come into engagement with the planetary gear on an inner peripheral surface, and provided so as to be rotatable; an output shaft coupled to the movable internal gear and configured to rotate the valve stem of the regulating valve; and a manual operation mechanism that rotates the sun gear or the planetary gear by a force applied from the outside of a housing.

3 Claims, 10 Drawing Sheets

(58) Field of Classification Search
CPC ...... F16H 1/2809; F16H 1/2863; F16H 13/10; F16H 13/12; F16H 13/14
USPC ....... 251/129.03, 129.11, 129.12, 248, 250.5
See application file for complete search history.

(56) References Cited

U.S. PATENT DOCUMENTS

| | | | | |
|---|---|---|---|---|
| 4,754,949 A | * | 7/1988 | Fukamachi | ........... F16K 31/535 251/129.03 |
| 6,379,276 B1 | * | 4/2002 | Cheng | ................ F16H 37/0826 475/330 |

FOREIGN PATENT DOCUMENTS

| | | |
|---|---|---|
| JP | 2008-157262 A | 7/2008 |
| JP | 2010-255833 A | 11/2010 |
| JP | 2014-016222 A | 1/2014 |
| KR | 20-0450505 Y1 | 10/2010 |

* cited by examiner

PLANETARY GEAR TRANSMISSION FOR A MOTOR AND MANUALLY OPERABLE VALVE

CROSS-REFERENCE TO RELATED APPLICATION

The present application claims the benefit of and priority to Japanese Patent Application No. 2015-208850, filed on Oct. 23, 2015, the entire contents of which are incorporated by reference herein.

TECHNICAL FIELD

The present disclosure relates to a setting/operating device for operating a valve stem of a regulating valve and relates, for example, to a setting/operating device for operating a valve stem of a rotary-type regulating valve.

BACKGROUND

In the related art, in a chemical plant or the like, a regulating valve is used for process control of a flow rate. A valve opening of the regulating valve is adjusted by a setting/operating device (hereinafter, also referred to as an "actuator") that operates a valve stem of a regulating valve based on a control signal from a positioner.

In general, in the case of a rotary-type regulating valve, such as a butterfly valve, a valve member of the regulating valve may be opened and closed by a force of a fluid that is under control. For example, in a case of an electric actuator, when an electric supply to the actuator is stopped due to an interruption of electric service, or the like, within a plant, a retaining force for a drive motor in an interior of the actuator is lost and an opening degree of the regulating valve may not be maintained.

Therefore, a power transmitting mechanism that drives the valve stem of the actuator requires a self-lock function that prevents the valve stem from operating even when no electric power is supplied. As the power transmitting mechanism that realizes the self-lock function, as disclosed in PTL 1 and PTL 2 described below for example, a paradox planetary gear mechanism is well known. PTL 3 describes a setting/operating device in which the planetary gear mechanism is employed as a power transmitting mechanism for a valve stem.

CITATION LIST

Patent Literature

[PTL 1] JP-A-2007-177405
[PTL 2] JP-A-2010-255833
[PTL 3] JP-A-2014-16222

SUMMARY

The present inventor has studied about an employment of the paradox planetary gear mechanism in the power transmitting mechanism in an actuator for realizing an electric actuator which achieves lower cost and compact profile. As a result of the study, the following problems are revealed.

In general, depending on an application to which a regulating valve is applied, the regulating valve needs to be operated manually. For example, in an air-conditioning system where a regulating valve controlled by an electric actuator is applied as a steam valve, when electric power supply to the actuator is stopped due to an interruption of electric service, or the like, the regulating valve, if open, needs to be closed manually in order to prevent steam at high temperature and high moisture from flowing out.

However, in the case where the paradox planetary gear mechanism is applied to the electric actuator, a gear cannot be rotated due to a self-lock function thereof even though a force is applied manually from the output shaft side of the actuator, so that a valve opening of the regulating valve cannot be changed. Therefore, the self-lock function of the paradox planetary gear mechanism needs to be temporarily unlocked in order to manually adjust the valve opening of the regulating valve.

A method of releasing the self-lock function of the paradox planetary gear mechanism is disclosed, for example, in PTL 2 described above. In a geared motor disclosed in PTL 2, in a normal operation, a fixed internal gear of a paradox planetary gear mechanism is locked (fixed) by inserting a slide bar into a receiving portion provided on the fixed internal gear provided at a predetermined position, and when releasing the self-locked state, the lock of the slide bar is released to let the fixed internal gear be in a free state.

However, according to the technology disclosed in PTL 2, the slide bar is fixed by being inserted into the receiving portion of the fixed internal gear after the fixed internal gear is rotated to a position where the slide bar resides. Therefore, the fixed internal gear cannot be stopped at a desired position. Therefore, even when the technology in PTL 2 is applied to the electric actuator having the paradox planetary gear mechanism, a valve stem cannot be fixed at a desired position even though the self-lock of the paradox planetary gear mechanism can be released. And, thus, the valve opening cannot be set to a desired value.

In view of such problems described above, it is an object of the invention to provide a setting/operating device including a paradox planetary gear mechanism which allows a manual operation of a valve stem of a regulating valve and fixation at a desired position.

A setting/operating device (100 to 102) for operating a valve stem of a regulating valve according to the invention includes: a sun gear (3a/10a/12) that rotates upon reception of a rotational force from a drive motor (2); a fixed internal gear (5) fixedly disposed in a form of surrounding the sun gear and having teeth on an inner peripheral surface thereof; a plurality of planetary gears (4_1 to 4_3) disposed between the sun gear and the fixed internal gear that rotate in engagement with the sun gear and the fixed internal gear while revolving around the sun gear; a movable internal gear (6/11) disposed coaxially with the fixed internal gear, having teeth that come into engagement with the planetary gears on the inner peripheral surface thereof, and provided so as to be rotatable; an output shaft (7/9a) coupled to the movable internal gear and configured to rotate the valve stem of the regulating valve; a housing (1) that accommodates the sun gear, the fixed internal gear, the planetary gears, and the movable internal gear; and a manual operation mechanism (3b, 8/10b, 10c/13a, 13b, 14) that rotates the sun gear or the planetary gears by a force applied from the outside of the housing.

In the setting/operating device described above, the manual operation mechanism may include a shaft portion (3b) that is coupled at one end thereof to the sun gear and has the same axis of rotation as the sun gear, and an operating member (8) provided so as to be operable from the outside of the housing and configured to provide the sun gear with a rotational force via the shaft portion.

In the above-described setting/operating device, the operating member is a disc-shaped dial, the movable internal gear and the output shaft have the same axis of rotation, the output shaft is formed into a rod shape and includes: a cut-away portion (7b) formed by cutting away part of an outer peripheral portion of the output shaft in a radial direction thereof; and a concave portion (7a) formed at a central portion of the output shaft in another radial direction thereof. And the manual operation mechanism may be disposed in such a manner that a center of the dial is aligned with a center of the concave portion in plan view, and part of the outer peripheral portion of the dial projects from the concave portion toward the cut-away portion in plan view.

In the description above, as an example, reference numerals in drawings corresponding to components of the invention are designated in parentheses.

From the description given thus far, according to the invention, a setting/operating device including a paradox planetary gear mechanism that allows a manual operation of a valve stem of a regulating valve and fixation at a desired position is achieved.

DETAILED DESCRIPTION

Hereinafter, embodiments of the invention will be described with reference to the drawings.

Embodiment 1

Figure 1:
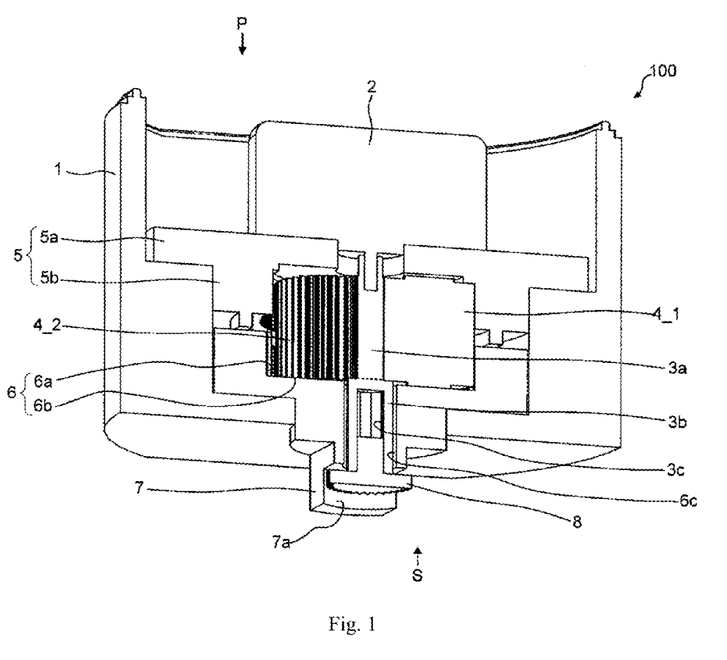
FIG. 1 is a cross-sectional perspective view illustrating a principal portion of a setting/operating device according to Embodiment 1.

FIG. 1 is a cross-sectional perspective view illustrating a principal portion of a setting/operating device according to Embodiment 1.

The setting/operating device 100 according to Embodiment 1 illustrated in FIG. 1 is a device configured to operate a regulating valve used in process control of a flow rate in a plant, or the like, and is configured to control a valve opening of the regulating valve by operating a valve stem of the regulating valve in accordance with an operation signal supplied from a positioner provided externally. For example, the setting/operating device 100 is an electric actuator configured to operate a rotary-type regulating valve, such as a butterfly valve.

The setting/operating device 100 according to Embodiment 1 includes a paradox planetary gear mechanism as a power transmitting mechanism that operates the valve stem of the regulating valve, and includes a self-lock function which prevents the valve stem from operating even when no electric power is supplied to the electric motor. In addition, the setting/operating device 100 has a function that allows a manual operation of the valve stem to fix the valve stem at a given valve opening even when no power is supplied to the electric motor.

A specific structure for realizing the above-described functions in the setting/operating device 100 will be described in detail below.

Figure 2:
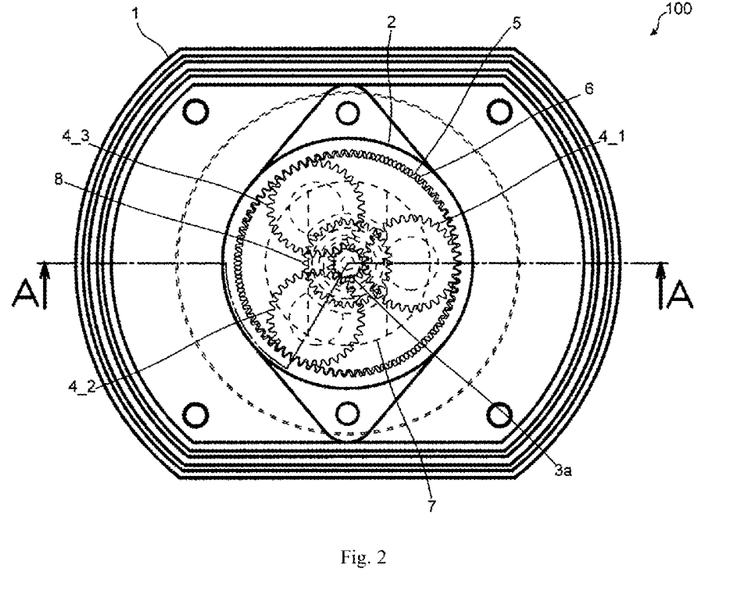
FIG. 2 is a plan view illustrating a principal portion of the setting/operating device according to Embodiment 1.
Figure 3:
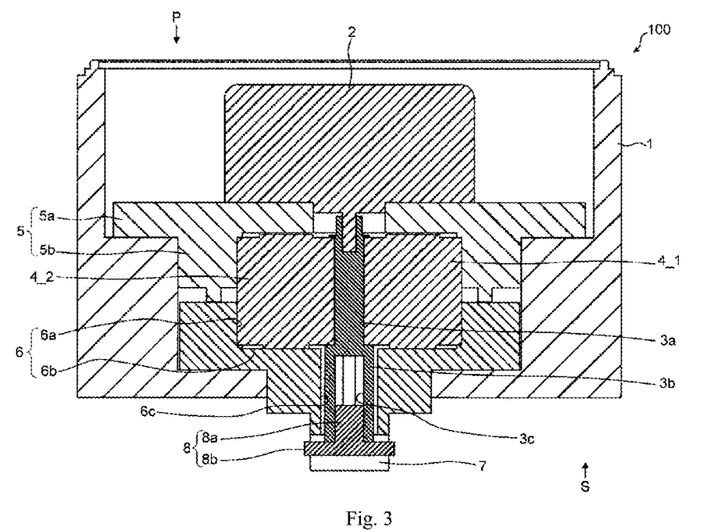
FIG. 3 is a cross-sectional view illustrating a principal portion of a setting/operating device according to Embodiment 1.

FIG. 2 illustrates a planar structure of a principal portion of a setting/operating device 100 when viewed from a direction P in FIG. 1, and FIG. 3 illustrates a cross section of the setting/operating device 100 taken along the line A-A in FIG. 2. In FIG. 2, part of the components of the setting/operating device 100 is omitted in order to clarify positional relationships among the gears which constitute a power transmitting mechanism of the setting/operating device 100.

As illustrated in FIGS. 1 to 3, the setting/operating device 100 includes a housing 1, a drive motor 2, a sun gear 3a, planetary gears 4_1 to 4_3, a fixed internal gear 5, a movable internal gear 6, an output shaft 7, a shaft portion 3b, and a dial 8.

Although the setting/operating device 100 also includes an electronic circuit portion and a power supply unit for controlling the rotation of the drive motor 2 based on an operation signal supplied from a positioner, illustration of these components is omitted in FIGS. 1 to 3.

The housing 1 is a container for accommodating the components of the setting/operating device 100 and is formed of, for example, a metallic material. FIG. 1 illustrates a case where a lid that covers an upper portion (P-side in FIG. 1) of the housing 1 is removed. However, the lid that covers the upper portion of the housing 1 is installed in a final product (for example, as shown in FIG. 3).

The drive motor 2 is an electric motor that is controlled by the electronic circuit portion (not illustrated) described above.

The sun gear 3a is a gear that is coupled to the rotation shaft of the drive motor 2 and is a gear that rotates (rotates about its own axis) upon reception of a rotational force of the rotation shaft.

The fixed internal gear 5 is a gear that is fixedly disposed in a form of surrounding the sun gear 3a and has teeth on an inner peripheral surface thereof (which may be annular teeth or teeth on an annular surface to form an annular gear, annular gear surface, or annular gear portion). Specifically, the fixed internal gear 5 includes a plate 5a configured to support the drive motor 2 and rotatably hold the planetary gears 4 (4_1 to 4_3) in the direction P, and a gear portion 5b that engages the periphery of the planetary gears 4_1 to 4_3.

Although the plate 5a and the gear portion 5b may be separate components, a reduction in number of components is achieved by forming these members integrally.

The planetary gears 4_1 to 4_3 (also referred to as "planetary gear 4" when they are collectively expressed) are gears which are disposed between the sun gear 3a and the fixed internal gear 5, and are rotated in engagement with the sun gear 3a and the fixed internal gear 5 while revolving around the sun gear 3a.

The movable internal gear 6 is disposed coaxially with the fixed internal gear 5, has teeth that come into engagement with the planetary gear 4 on the inner peripheral surface thereof (which may be annular teeth or teeth on an annular surface to form an annular gear, annular gear surface, or annular gear portion) and is provided so as to be rotatable. As illustrated in FIGS. 1 and 3, the movable internal gear 6 includes a gear portion 6a that engages the planetary gear 4 and a bottom portion 6b that rotatably supports the planetary gear 4. The bottom portion 6b includes a through-hole 6c that is formed in a direction of an axis of rotation (which may also be referred to as an "axial direction") of the movable internal gear 6.

An output shaft 7 is a component that is coupled to the movable internal gear 6 and is configured to rotate the valve stem of the regulating valve. As illustrated in FIGS. 1 and 3, the output shaft 7 has the same axis of rotation as the movable internal gear 6 and is formed integrally with the movable internal gear 6.

The shaft portion 3b and the dial 8 constitute the manual operation mechanism that rotates the sun gear 3a by a force applied from the outside of the housing 1. Detailed description of the shaft portion 3b and the dial 8 will be described later.

The sun gear 3a, the planetary gear 4, the fixed internal gear 5, and the movable internal gear 6 are formed of, for example, a resin material, such as plastic, and a metallic material. The sun gear 3a, the planetary gear 4, the fixed internal gear 5, and the movable internal gear 6 constitute one paradox planetary gear mechanism. The paradox planetary gear mechanism will be described below in detail.

Figure 4:
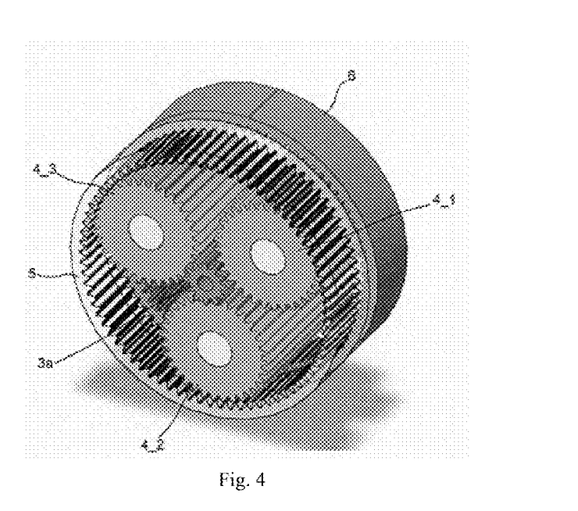
FIG. 4 is a perspective view illustrating a structure of a paradox planetary gear mechanism including a sun gear, planetary gears, a fixed internal gear, and a movable internal gear.

FIG. 4 is a perspective view illustrating a structure of the paradox planetary gear mechanism including the sun gear 3a, the planetary gear 4, the fixed internal gear 5, and the movable internal gear 6.

As illustrated in FIG. 4, the planetary gears 4_1 to 4_3 are disposed in engagement with the sun gear 3a disposed at a central portion of the paradox planetary gear mechanism. In addition, the fixed internal gear 5 configured to engage part of the areas of the planetary gear 4 and configured to guide the rotation of the planetary gears 4_1 to 4_3 is fixedly disposed in the periphery of the planetary gears 4_1 to 4_3, and the movable internal gear 6, which engages other areas of the planetary gear 4 and is configured to be rotatable, is also disposed therein.

In the paradox planetary gear mechanism described above, the sun gear 3a rotates upon reception of a rotational force from a rotation shaft of the drive motor 2, which in turn causes the planetary gears 4_1 to 4_3 to rotate (revolve) along the fixed internal gear 5 while rotating. The movable internal gear 6 rotates upon reception of the rotational force of the planetary gears 4_1 to 4_3. The output shaft 7 can be rotated by a significantly reduced rotational force of the drive motor 2 by coupling the output shaft 7 (valve stem) to the movable internal gear 6.

Since the paradox planetary gear mechanism described above is capable of rotating the valve stem by a significantly reduced rotational force from the drive motor 2, the output shaft 7 (valve stem), which is coupled to the movable internal gear 6, cannot be rotated even when a force is applied externally to the output shaft 7, or a significantly large force is required to rotate the output shaft 7. Therefore, even when the power supply to the drive motor 2 is interrupted due to an interruption of electric service, the valve opening of the regulating valve may be substantially fixed, so that the self-lock function of the regulating valve may be realized.

As described above, the self-lock function of the regulating valve is realized by the paradox planetary gear mechanism that includes the sun gear 3a, the planetary gear 4, the fixed internal gear 5, and the movable internal gear 6.

In addition, the paradox planetary gear mechanism of the present disclosure has a structure that rotates the movable internal gear 6 not by the drive motor 2, but manually. The structure of the paradox planetary gear mechanism will be described below in detail.

As described above, the shaft portion 3b and the dial 8 constitute the manual operation mechanism that rotates the sun gear 3a by a force applied from the outside of the housing 1.

The shaft portion 3b is a component coupled at one end thereof to the sun gear 3a, and has the same axis of rotation as the sun gear 3a. As illustrated in FIGS. 1 and 3, the shaft portion 3b is, for example, integrally formed with the sun gear 3a.

The dial 8 is an operating member provided so as to allow an operation from the outside of the housing 1, and configured to provide the sun gear 3a with a rotational force via the shaft portion 3b. The dial 8 is formed into, for example, a substantially disc shape, and includes a plurality of grooves on an outer peripheral portion 8b thereof.

As illustrated in FIGS. 1 and 3, the shaft portion 3b is accommodated in the through-hole 6c of the movable internal gear 6, and partly projects to the outside of the housing 1 together with the movable internal gear 6. The shaft portion 3b is formed into a cylindrical shape opening at one end thereof and bottomed on the other end. Specifically, an end portion of the shaft portion 3b on the side projecting from the housing 1 is provided with a hole 3c formed in the direction of an axis of rotation of the shaft portion 3b.

The hole 3c is formed into a polygonal shape (for example, hexagonal shape) in plan view, and a projection 8a of the dial 8 also has a shape corresponding to the hole 3c (polygonal shape in plan view). The projection 8a of the dial 8 is fitted into the hole 3c, so that the shaft portion 3b and the dial 8 are coupled.

Since the shaft portion 3b and the dial 8 are coupled as described above, a rotational force can be applied directly to the sun gear 3a via the shaft portion 3b not by the drive motor 2 but by rotating the dial 8 manually, for example. Accordingly, even in a state in which the drive motor 2 is stopped, the movable internal gear 6 can be rotated via the sun gear 3a by operating the dial 8 manually, and thus the valve stem may be rotated to a position that achieves a desired valve opening. In contrast, as described above, since the paradox planetary gear mechanism is employed as the power transmitting mechanism of the setting/operating device 100, the valve stem can be fixed at the position described above by a speed reduction ratio of the paradox planetary gear mechanism after the valve stem is rotated to a desired position by the dial 8.

Subsequently, a structure of a peripheral portion of the dial 8 will be described.

Figure 5:
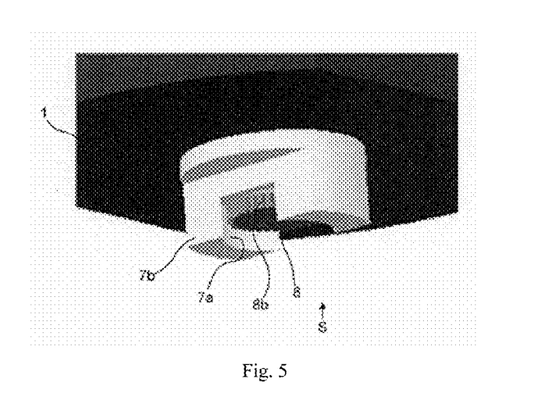
FIG. 5 is a perspective view illustrating a peripheral portion of a dial in the setting/operating device according to Embodiment 1 in an enlarged scale.

FIG. 5 is a perspective view illustrating a peripheral portion of a dial 8 in the setting/operating device 100 according to Embodiment 1 in an enlarged scale.

Figure 6:
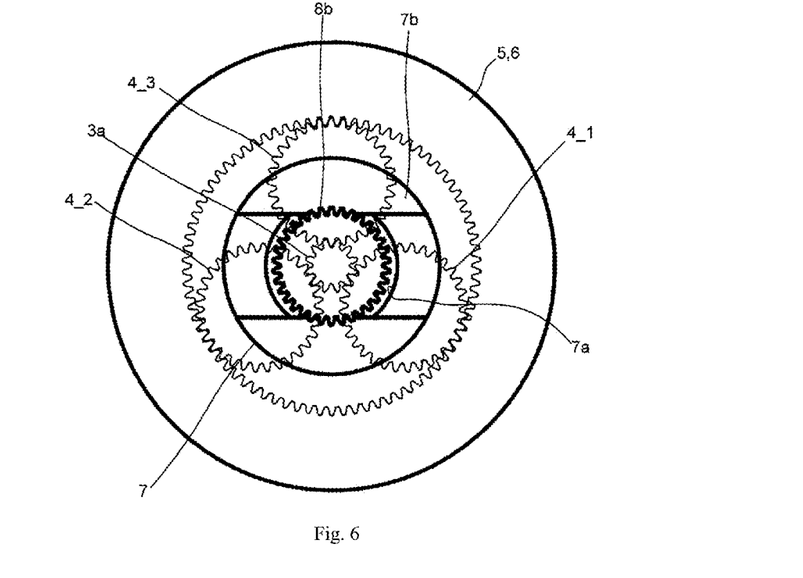
FIG. 6 is a plan view illustrating the setting/operating device according to Embodiment 1 when viewed from a valve stem side.

FIG. 6 is a plan view illustrating the setting/operating device 100 according to Embodiment 1 viewed from the valve stem side (e.g., in direction S of FIGS. 1, 3, and 5).

As illustrated in FIGS. 5 and 6, the output shaft 7 is formed into a rod shape (for example, cylindrical shape) and includes a cut-away portion 7*b* which is formed by cutting away part of an outer peripheral portion of the output shaft 7 in a radial direction and a concave portion 7*a* formed at a central portion of the output shaft 7 in another radial direction. And as shown in FIGS. 5 and 6, output shaft 7 may comprise two opposing cut-away portions 7*b* (on opposite sides of output shaft 7) and corresponding two opposing concave portions 7*a* (on corresponding opposite sides of output shaft 7).

The dial 8 is disposed at the concave portion 7*a* of the output shaft 7. Specifically, as illustrated in FIG. 6, the dial 8 is disposed in such a manner that the center of the dial 8 is aligned with the center of the concave portion 7*a* in plan view, and part of an outer peripheral portion 8*b* of the dial 8 protrudes from the concave portion 7*a* toward the cut-away portion 7*b* in plan view.

With the output shaft 7 formed and the dial 8 disposed in the manner described above, even when the dial 8 is disposed coaxially with the sun gear 3*a* as illustrated in FIGS. 1 to 6, the output shaft 7 does not become an impediment to the operation of the dial 8, and thus manual operation of the valve stem can easily be performed.

As described thus far, according to the setting/operating device 100 of Embodiment 1, the paradox planetary gear mechanism is employed as the power transmitting mechanism, and the manual operation mechanism configured to apply the external force to the sun gear 3 of the paradox planetary gear mechanism as a rotational force is provided. Therefore, the dial 8 may be manually operated to rotate the movable internal gear 6 even in a state in which the drive motor 2 is stopped due to reasons such as an interruption of electric service, for example. Also, since Embodiment 1 does not have a structure in which the self-lock function of the paradox planetary gear mechanism is released as in the related art described above, the valve stem may be fixed after the operation of the dial 8. In other words, according to the setting/operating device 100 of Embodiment 1, the manual operation of the valve stem is enabled while realizing the self-lock function of the regulating valve.

Also, since Embodiment 1 does not have a structure in which the self-lock function of the paradox planetary gear mechanism is released as described above, the power transmitting mechanism may be prevented from becoming complex. Accordingly, the manual operation function of the valve stem is realized while reducing the manufacturing cost. Also, as described above, by integrally forming the plate 5*a* and the gear portion 5*b* as the fixed internal gear 5, further reduction of the manufacturing cost is enabled.

According to the setting/operating device 100 of Embodiment 1, the disc-shaped dial 8 is used as the operating member of the manual operation mechanism described above, and thus a direct application of the rotational force to the sun gear 3*a* is facilitated.

According to the setting/operating device 100 of Embodiment 1, the dial 8 is disposed in the concave portion 7*a* formed on the output shaft 7 in such a manner that part of the outer peripheral portion 8*b* projects toward the cut-away portion 7*b*, so that the manual operation of the valve stem is facilitated as described above.

Embodiment 2

Figure 7:
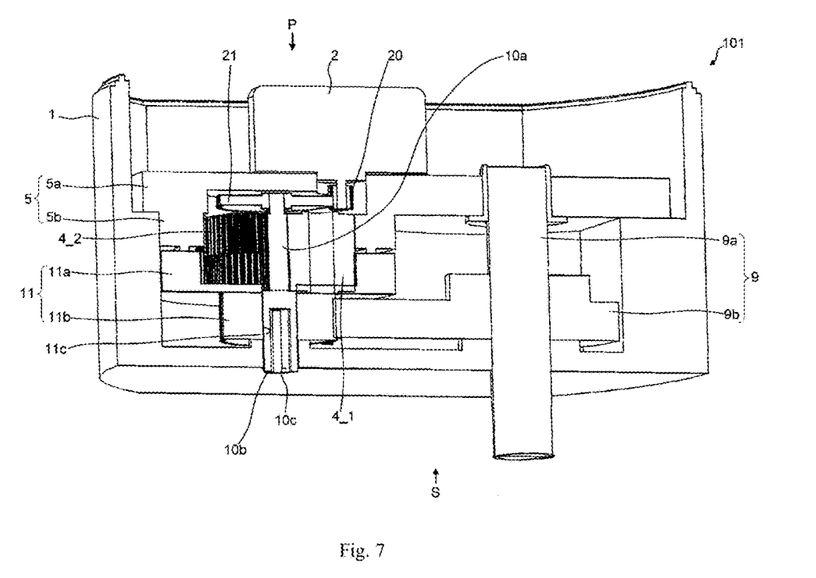
FIG. 7 is a cross-sectional perspective view illustrating a principal portion of a setting/operating device according to Embodiment 2.

FIG. 7 is a cross-sectional perspective view illustrating a principal portion of a setting/operating device according to Embodiment 2.

A setting/operating device 101 according to Embodiment 2 illustrated in FIG. 7 is different from the setting/operating device 100 of Embodiment 1 in that the sun gear and the movable internal gear are not disposed on the same axis as the output shaft and are disposed on axial lines different from each other.

In the setting/operating device 101 of Embodiment 2, the same components as in the setting/operating device 100 according to Embodiment 1 are designated by the same reference numerals and detailed description will be omitted.

Figure 8:
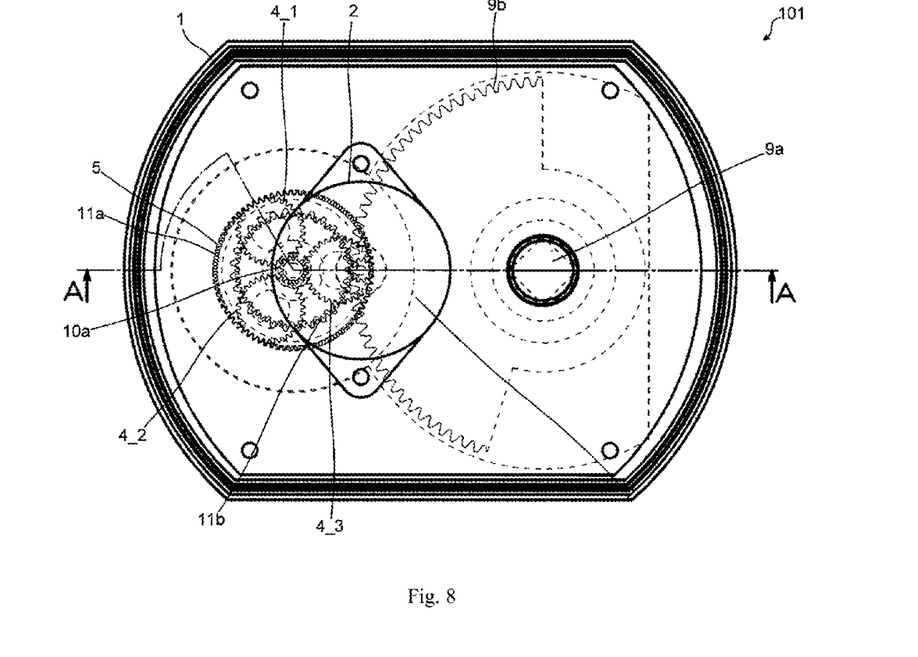
FIG. 8 is a plan view illustrating a principal portion of the setting/operating device according to Embodiment 2.
Figure 9:
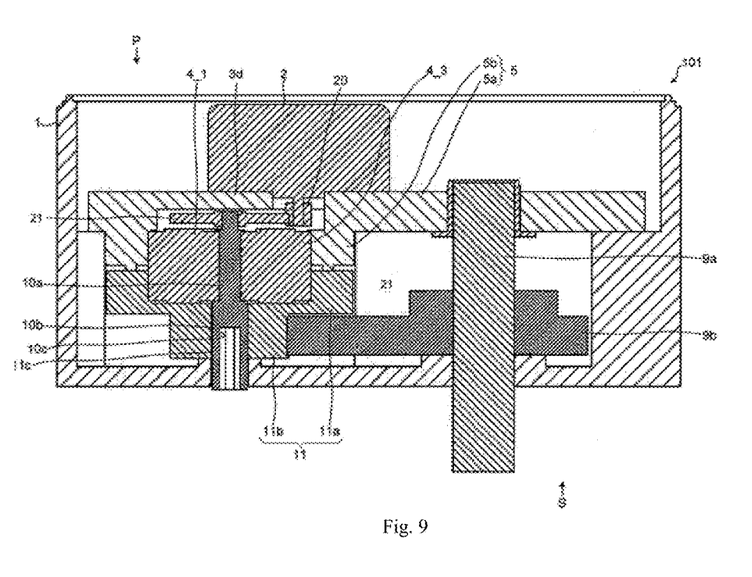
FIG. 9 is a cross-sectional view illustrating a principal portion of a setting/operating device according to Embodiment 2.

FIG. 8 is a plan view illustrating a principal portion of the setting/operating device of Embodiment 2, and FIG. 9 is a cross-sectional view illustrating a principal portion of the setting/operating device according to Embodiment 2.

FIG. 8 illustrates a planar structure of a principal portion of a setting/operating device 101 when viewed from a direction P in FIG. 7, and FIG. 9 illustrates a cross section of the setting/operating device 101 taken along the line A-A in FIG. 8. In FIGS. 8 and 9, part of the components of the setting/operating device 101 is omitted in order to clarify positional relationships among the gears which constitute a power transmitting mechanism of the setting/operating device 101.

As illustrated in FIGS. 7 to 9, the setting/operating device 101 includes a housing 1, a drive motor 2, a sun gear 10*a*, planetary gears 4_1 to 4_3, a fixed internal gear 5, a movable internal gear 11, a shaft portion 10*b*, a gear 9*b*, and an output shaft 9*a*.

The movable internal gear 11 and the output shaft 9*a* are disposed apart from each other and axes of rotation thereof are disposed in parallel to each other. Provided between the movable internal gear 11 and the output shaft 9*a* is the gear 9*b* as a transmission mechanism that transmits rotation of the movable internal gear 11 to the output shaft 9*a*.

The movable internal gear 11 retains the planetary gears 4_1 to 4_3 as illustrated in FIGS. 7 and 9 and includes a first gear portion 11*a* that engages peripheries of the respective planetary gears 4_1 to 4_3, and a second gear portion 11*b* coupled to the first gear portion 11*a* and having the same axis of rotation as the first gear portion 11*a*. The first gear portion 11*a* and the second gear portion 11*b* are each provided with a through-hole 11*c* that penetrates through central portions (rotations shafts) thereof.

The output shaft 9*a* is a rod-shaped member that is to be connected to a valve stem of a regulating valve. The output shaft 9*a* is inserted into a through-hole formed in plate portion 5*a* of the fixed internal gear 5 and is rotatably retained by the fixed internal gear 5. The gear 9*b* is coupled to the output shaft 9*a*, and teeth provided on an outer peripheral portion thereof engage teeth of the second gear portion 11*b* of the movable internal gear 11.

The setting/operating device 101 of Embodiment 2 acts as follows.

When the drive motor 2 rotates, a rotational force thereof is transmitted to the sun gear 10*a* via the gear 20 and a gear 21, so that the sun gear 10a and the shaft portion 10b coupled thereto rotate. When the sun gear 10a rotates, a planetary gear 4 disposed therearound rotates and revolves along the fixed internal gear 5, so that the first gear portion 11a and the second gear portion 11b of the movable internal gear 11 rotate. The rotational force of the movable internal gear 11 transmitted to the gear 9b causes the shaft 9a coupled to the gear 9b to rotate. Accordingly, rotation of the valve stem connected to the shaft 9a is achieved.

The setting/operating device 101 of Embodiment 2 includes a manual operation mechanism for manually operating the valve stem in the same manner as the setting/operating device 100 of Embodiment 1. Specifically, as illustrated in FIGS. 7 and 9, a shaft portion 10b that rotates the sun gear 10a by a force applied from the outside of housing 1 is provided as the manual operation mechanism.

Specifically, the shaft portion 10b is a component coupled at one end thereof to the sun gear 10a, and has the same axis of rotation as the sun gear 10a. The shaft portion 10b is integrally formed with the sun gear 10a, for example.

As illustrated in FIGS. 7 and 9, the shaft portion 10b is accommodated in the through-hole 11c of the movable internal gear 11, and partly projects to the outside of the housing 1. The shaft portion 10b is formed into a cylindrical shape opening at one end thereof and bottomed on the other end. Specifically, an end portion of the shaft portion 10b on a side projecting from the housing 1 is provided with a hole 10c formed in a direction of an axis of rotation of the sun gear 10a.

Figure 10:
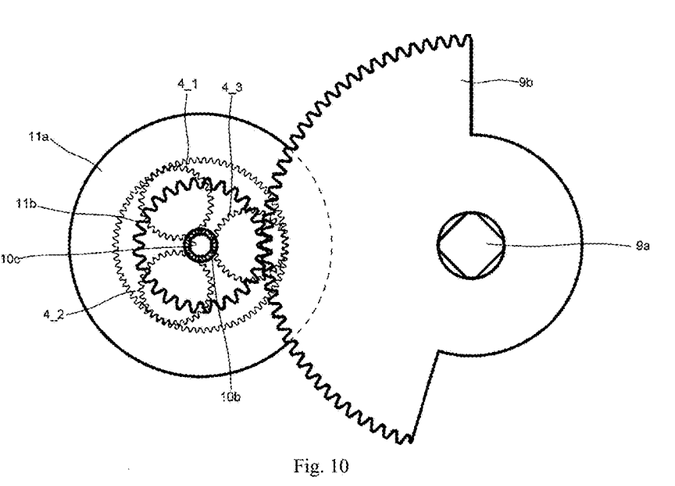
FIG. 10 is a plan view illustrating the setting/operating device according to Embodiment 2 when viewed from a valve stem side.

FIG. 10 is a plan view illustrating the setting/operating device 101 according to Embodiment 2 when viewed from a valve stem side (direction S in FIGS. 7 and 9).

As illustrated in FIG. 10, the hole 10c is formed into a polygonal shape in plan view. For example, a tool that meets the shape of the hole 10c is inserted into the hole 10c and is rotated therein, rotation of the sun gear 10a is achieved without depending on the drive motor 2. For example, in the case where the hole 10c is formed into a hexagonal shape in plan view, the rotation of the sun gear 10a is achieved by inserting a hexagonal rod spanner (hexagonal rod wrench) having the shape conforming thereto and rotating the same in the hole 10c.

According to the setting/operating device 101 of Embodiment 2 described thus far, in a structure in which the sun gear 10a and the movable internal gear 11 of the paradox planetary gear mechanism are not on the same axis as the output shaft 9a, the hole 10c having the polygonal shape in plan view is formed on the shaft portion 10b coupled to the sun gear 10a and projecting from the housing 1, so that the rotation of the sun gear 10a can be achieved by inserting a tool into the hole 10c. Accordingly, even in a state in which the drive motor 2 is stopped for reasons such as an interruption of electric service, for example, the movable internal gear 11 can be manually rotated, and thus the valve stem may be rotated and fixed to a position that achieves a desired valve opening. In other words, according to the setting/operating device 101 of Embodiment 2, the manual operation of the valve stem is enabled while realizing the self-lock function of the regulating valve in the same manner as the setting/operating device 100 of Embodiment 1.

Embodiment 3

Figure 11:
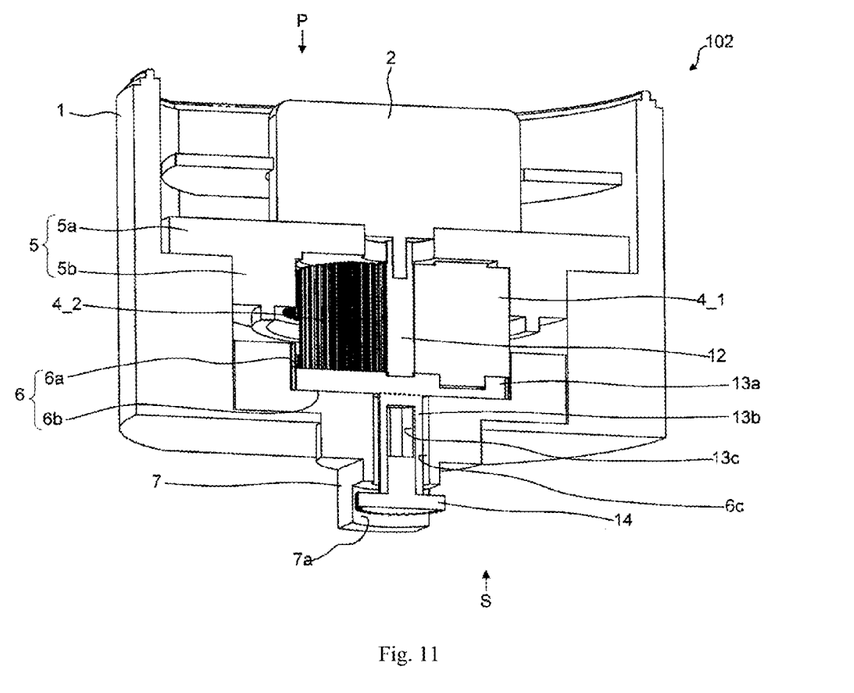
FIG. 11 is a cross-sectional perspective view illustrating a principal portion of a setting/operating device according to Embodiment 3.

FIG. 11 is a cross-sectional perspective view illustrating a principal portion of a setting/operating device according to Embodiment 3.

A setting/operating device 102 of Embodiment 3 illustrated in FIG. 11 is different from the setting/operating device 100 of Embodiment 1 in that a manual operation mechanism that rotates the planetary gear instead of the sun gear is provided.

In the setting/operating device 102 of Embodiment 3, the same components as in the setting/operating device 100 according to Embodiment 1 are designated by the same reference numerals and detailed description will be omitted.

Figure 12:
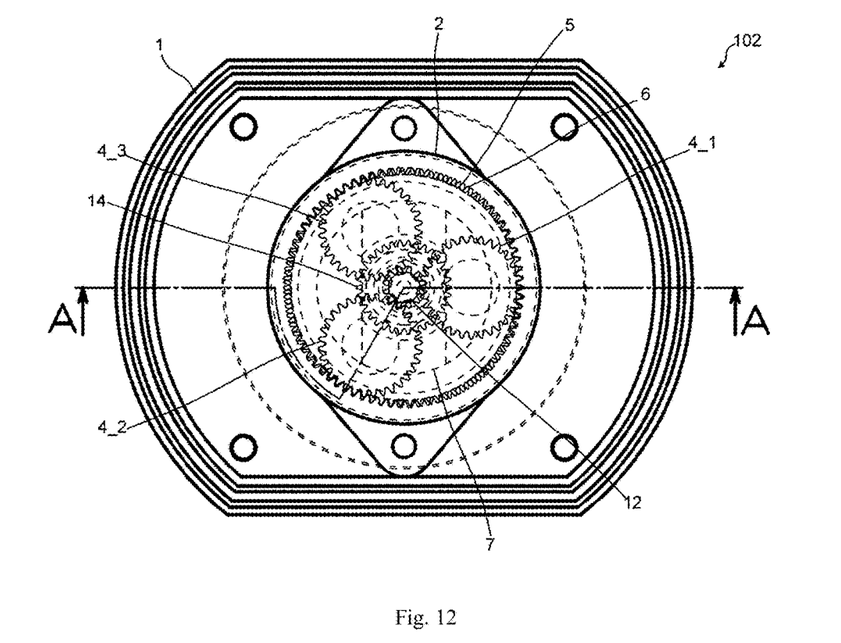
FIG. 12 is a plan view illustrating a principal portion of the setting/operating device according to Embodiment 3.
Figure 13:
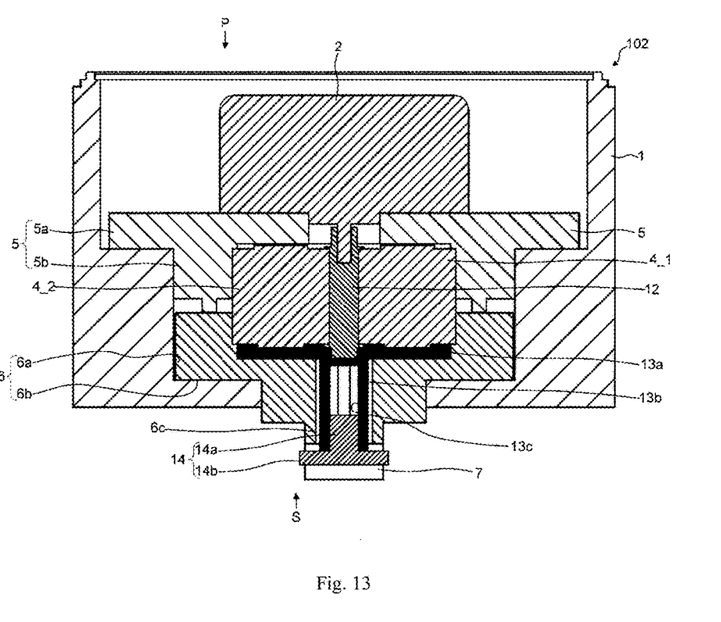
FIG. 13 is a cross-sectional view illustrating a principal portion of a setting/operating device according to Embodiment 3.

FIG. 12 is a plan view illustrating a principal portion of the setting/operating device of Embodiment 3, and FIG. 13 is a cross-sectional view illustrating a principal portion of the setting/operating device according to Embodiment 3.

FIG. 12 illustrates a planar structure of a principal portion of a setting/operating device 102 when viewed from a direction P in FIG. 11, and FIG. 13 illustrates a cross section of the setting/operating device 102 taken along the line A-A in FIG. 12. In FIGS. 12 and 13, part of the components of the setting/operating device 102 is omitted in order to clarify positional relationships among the gears which constitute a power transmitting mechanism of the setting/operating device 102.

As illustrated in FIGS. 11 to 13, the setting/operating device 102 includes a housing 1, a drive motor 2, a sun gear 12, planetary gears 4_1 to 4_3, a fixed internal gear 5, a movable internal gear 6, an output shaft 7, a carrier 13a, a shaft portion 13b, and a dial 14.

The carrier 13a is a seat disposed in the movable internal gear 6. It rotatably supports the planetary gear 4 and is rotatably provided coaxially with the movable internal gear 6. For example, a through-hole is formed at a central portion (rotation shaft) of each of the planetary gears 4_1 to 4_3, and projections are formed on the carrier 13a corresponding to the through holes of the respective planetary gears 4_1 to 4_3. The planetary gears 4_1 to 4_3 are supported respectively by the projections formed on the carrier 13a and inserted into the through-holes of the planetary gears 4_1 to 4_3, respectively.

With the carrier 13a configured as described above, when the drive motor 2 rotates, the carrier 13a rotates together with the planetary gears 4_1 to 4_3 by a rotational force from the sun gear 12.

The shaft portion 13b is a component coupled at one end thereof to the carrier 13a and has the same axis of rotation as the carrier 13a. The shaft portion 13b is integrally formed with the carrier 13a, for example.

A dial 14 is an operating member provided so as to be operable from the outside of the housing 1. It is configured to provide the planetary gear with a rotational force via the shaft portion 13b and is formed into a substantially disc shape with a plurality of grooves formed on an outer peripheral portion 14b in the same manner as the dial 8 in Embodiment 1 described above.

As illustrated in FIGS. 11 and 13, the shaft portion 13b is accommodated in the through-hole 6c of the movable internal gear 6, and partly projects to the outside of the housing 1 together with the movable internal gear 6. The shaft portion 13b is formed into a cylindrical shape opening at one end thereof and bottomed on the other end. Specifically, an end portion of the shaft portion 13b on a side projecting from the housing 1 is provided with a hole 13c formed in a direction of an axis of rotation of the sun gear 12.

The projection 14a of the dial 14 is inserted into the hole 13c, and is coupled to the carrier 13a. The dial 14 is formed into a disc shape having the same axis of rotation as the carrier 13a.

A hole 13c is formed into a polygonal shape (for example, hexagonal shape) in plan view, and the projection 14a of the dial 14 also has a shape corresponding to the hole 13c (polygonal shape in plan view). The projection 14a of the dial 14 is fitted into the hole 13c, so that the shaft portion 13b and the projection 14a are coupled.

Since the carrier 13a and the dial 14 are coupled to each other via the shaft portion 13b as described above, application of a rotational force to the planetary gear 4 via the carrier 13a is achieved without depending on the drive motor 2 by, for example, manually rotating the dial 14. Accordingly, even in a state in which the drive motor 2 is stopped, the movable internal gear 6 can be rotated by operating the dial 14 manually and rotating the planetary gear 4, and thus the valve stem may be rotated to a position that achieves a desired valve opening.

As described above, since the paradox planetary gear mechanism is employed as the power transmitting mechanism of the setting/operating device 102, the valve stem can be fixed at a desired position by a speed reduction ratio of the paradox planetary gear mechanism after the valve stem is rotated to the desired position using the dial 14.

A configuration of the output shaft 7 in the periphery of the dial 14 is the same as that of the setting/operating device 100 of Embodiment 1 (see FIGS. 5 and 6).

As described thus far, according to the setting/operating device 102 of Embodiment 3, the paradox planetary gear mechanism is employed as the power transmitting mechanism, and a manual operation mechanism configured to apply an external force to the planetary gear 4 of the paradox planetary gear mechanism as a rotational force is provided. Therefore, the dial 14 may be manually operated to rotate the movable internal gear 6 even in a state in which the drive motor 2 is stopped due to reasons such as an interruption of electric service, for example, and the valve stem can be rotated and fixed to a position where the desired valve opening is achieved. In other words, according to the setting/operating device 102 of Embodiment 3, the manual operation of the valve stem is enabled while realizing a self-lock function of a regulating valve.

In addition, direct application of the rotational force to the planetary gear 4 is achieved easily by using the carrier 13a that supports the planetary gear 4 and is capable of rotating together with the planetary gear 4, the shaft portion 13b being coupled to the carrier 13a, and the dial 14 being coupled to the shaft portion 13b as the above-described manual operation mechanism.

Since the setting/operating device 102 of Embodiment 3 has a configuration in which the rotational force is applied directly to the planetary gear 4, the number of rotations may be smaller than the case where the sun gear is directly operated (e.g., Embodiments 1 and 2), although an operation torque is increased.

As described above, the invention implemented by the inventors has been described specifically based on the embodiments. However, the invention is not limited thereto, and it is needless to say that the invention can be modified in various ways without departing from the scope thereof.

For example, in Embodiments 1 and 3, the case where the dial 8, 14 and the shaft portion 3b, 13b, which constitute the manual operation mechanism, are separate components has been exemplified. However, the invention is not limited thereto, and, for example, the dial 8, 14 and the shaft portion 3b, 13b may be formed integrally.

In Embodiments 1 and 2, the case where the sun gear 3a, 10a and the shaft portion 3b, 10b are formed integrally has been exemplified. However, the sun gear 3a, 10a and the shaft portion 3b, 10b may be formed as separate components and coupled. In the same manner, the carrier 13a and the shaft portion 13b may be formed as separate components and coupled in Embodiment 3.

In Embodiment 2, the method of rotating the sun gear 10a by inserting a tool in the hole 10c of the shaft portion 10b has been exemplified. However, the invention is not limited thereto, and a dial for manual operation may be fitted into the hole 10c of the shaft portion 10b as in the setting/operating device 100 of Embodiment 1.

In Embodiment 2, the case where the movable internal gear 11 and the output shaft 9a are disposed in parallel has been exemplified. However, the invention is not limited thereto, and a different configuration is also applicable if the axis of rotation of the movable internal gear 11 and the axis of rotation of the output shaft 9a may be disposed at positions not on the same line. For example, the axis of rotation of the movable internal gear 11 and the axis of the output shaft 9a may be perpendicular to each other.

Although the case in which the movable internal gear 6 and the output shaft 7 are formed integrally has been exemplified in Embodiments 1 and 3, the invention is not limited thereto, and a configuration in which these components may be formed as separate components and coupled to have the same axis of rotation may be used.

DESCRIPTION OF REFERENCE NUMERALS AND SIGNS 100 to 102 . . . setting/operating device, 1 . . . housing, 2 . . . drive motor, 3a, 10a, 12 . . . sun gear, 3b, 10b, 13b . . . shaft portion, 3c, 10c, 13c . . . hole, 4_1, 4_2, 4_3, 4 . . . planetary gear, 5 . . . fixed internal gear, 5a . . . plate, 5b . . . gear portion, 6, 11 . . . movable internal gear, 6a . . . gear portion, 6b . . . bottom portion, 6c . . . through-hole, 7, 9a . . . output shaft, 7a . . . concave portion, 7b . . . cut-away portion, 8, 14 . . . dial, 8a . . . projection, 8b . . . outer peripheral portion, 9b, 20, 21 . . . gear, 11a . . . first gear portion, 11b . . . second gear portion, 13a . . . carrier

The invention claimed is:
1. A setting/operating device comprising:
a sun gear configured to rotate upon reception of a rotational force from a drive motor;
a fixed internal gear fixedly disposed to surround the sun gear and configured to have teeth on a fixed inner peripheral surface;
a plurality of planetary gears disposed between the sun gear and the fixed internal gear that rotate in engagement with the sun gear and the fixed internal gear while revolving around the sun gear;
a movable internal gear disposed coaxially with the fixed internal gear, said movable internal gear being configured with teeth on a movable inner peripheral surface that come into engagement with the planetary gears and being configured to be rotatable;
an output shaft coupled to the movable internal gear and configured to rotate a valve stem of a regulating valve;
a housing that accommodates the sun gear, the fixed internal gear, the planetary gears, and the movable internal gear;
a manual operation mechanism configured to rotate one of the sun gear and the plurality of planetary gears by an external force, wherein the manual operation mechanism comprises:
- a seat disposed in the movable internal gear, the seat being configured to rotatably support the planetary gears and to be rotatable coaxially with the movable internal gear;
- a shaft portion coupled at one end to the seat and having a same axis of rotation as the seat; and
- an operating member configured to be operable from an outside of the housing to provide the planetary gears with a rotational force via the shaft portion as the external force, the operating member is a disc-shaped dial, the movable internal gear and the output shaft have a same axis of rotation, the output shaft is formed into a rod shape, the output shaft comprises one or more cut-away portions each formed by cutting away part of an outer peripheral portion of the output shaft in a respective radial direction and one or more concave portions each formed at a central portion of the output shaft in another respective radial direction, and the manual operation mechanism is disposed in such a manner that a center of the dial is aligned with a center of the one or more concave portions in a plan view, and one or more parts of an outer peripheral portion of the dial projects from the one or more concave portions toward the one or more cut-away portions in the plan view.

2. A setting/operating device comprising:
- a sun gear configured to rotate upon reception of a rotational force from a drive motor;
- a fixed internal gear fixedly disposed to surround the sun gear and configured to have teeth on a fixed inner peripheral surface;
- a plurality of planetary gears disposed between the sun gear and the fixed internal gear that rotate in engagement with the sun gear and the fixed internal gear while revolving around the sun gear;
- a movable internal gear disposed coaxially with the fixed internal gear, said movable internal gear being configured with teeth on a movable inner peripheral surface that come into engagement with the planetary gears and being configured to be rotatable;
- an output shaft coupled to the movable internal gear and configured to rotate a valve stem of a regulating valve;
- a housing that accommodates the sun gear, the fixed internal gear, the planetary gears, and the movable internal gear; and
- a manual operation mechanism comprising a shaft portion coupled at one end to the sun gear and that rotates one of the sun gear and the plurality of planetary gears by an external force and an operating member that is operable from an outside of the housing for exerting a rotational force via the shaft portion as the external force, wherein the operating member is a disc-shaped dial, the output shaft comprises one or more cut-away portions each formed by cutting away part of an outer peripheral portion of the output shaft in a respective radial direction and one or more concave portions each formed at a central portion of the output shaft in another respective radial direction, and a center of the dial is aligned with a center of the one or more concave portions in a plan view, and one or more parts of an outer peripheral portion of the dial projects from the one or more concave portions toward the one or more cut-away portions in the plan view.

3. A setting/operating device comprising:
- a sun gear configured to rotate upon reception of a rotational force from a drive motor;
- a fixed internal gear fixedly disposed to surround the sun gear and configured to have teeth on a fixed inner peripheral surface;
- a plurality of planetary gears disposed between the sun gear and the fixed internal gear that rotate in engagement with the sun gear and the fixed internal gear while revolving around the sun gear;
- a movable internal gear disposed coaxially with the fixed internal gear, said movable internal gear being configured with teeth on a movable inner peripheral surface that come into engagement with the planetary gears and being configured to be rotatable;
- an output shaft coupled to the movable internal gear and configured to rotate a valve stem of a regulating valve;
- a housing that accommodates the sun gear, the fixed internal gear, the planetary gears, and the movable internal gear;
- a manual operation mechanism configured to rotate one of the sun gear and the plurality of planetary gears by an external force;
- a transmitting mechanism configured to transmit rotation of the movable internal gear to the output shaft, wherein the movable internal gear and the output shaft are configured away from each other with different axes of rotation, the movable internal gear comprises a through-hole that penetrates in an axial direction, the manual operation mechanism has a same axis of rotation as the sun gear and comprises a shaft portion that is coupled at one end to the sun gear and that is exposed at another end to an outside of the housing, and the shaft portion comprises, at the another end, a hole formed in the axial direction, the hole having a polygonal shape in a plan view.

* * * * *